No. 880,042. PATENTED FEB. 25, 1908.
H. RIETMANN.
CRATE.
APPLICATION FILED MAY 20, 1907.
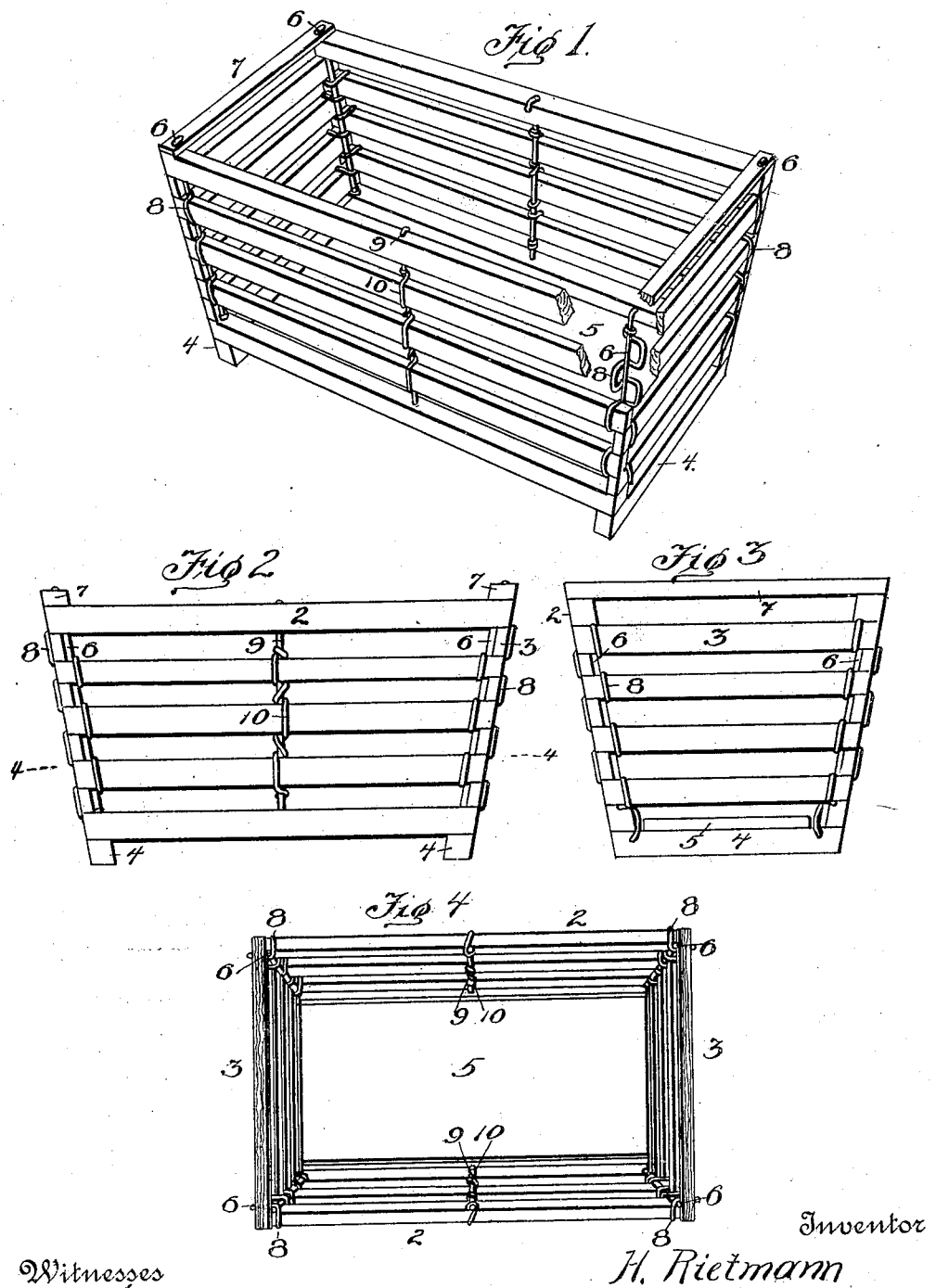
Witnesses
Geo. L. Thom
C. H. Griesbauer
Inventor
H. Rietmann
by H. B. Willson & Co.
Attorneys

UNITED STATES PATENT OFFICE.

HENRY RIETMANN, OF CROWN POINT, INDIANA.

CRATE.

No. 880,042.　　　Specification of Letters Patent.　　　Patented Feb. 25, 1908.

Application filed May 20, 1907. Serial No. 374,620.

*To all whom it may concern:*

Be it known that I, HENRY RIETMANN, a citizen of the United States, residing at Crown Point, in the county of Lake and State of Indiana, have invented certain new and useful Improvements in Crates; and I do declare the following to be a full, clear, and exact description of the invention, such as will enable others skilled in the art to which it appertains to make and use the same.

My invention has relation to new and useful improvements in crates; and has for its object to strengthen the corners and sides of a crate so that the same will not become easily damaged or broken by rough handling, the said crate being simple in construction, light and economical of production.

With the foregoing and other objects in view, the invention consists of certain novel features of construction, combination and arrangement of parts, as will be more fully described and particularly pointed out in the appended claims.

In the accompanying drawings,—Figure 1 is a perspective view of a crate constructed in accordance with my invention; Fig. 2 is a side elevation; Fig. 3 is an end view; and Fig. 4 is a cross sectional view on the line 4—4 of Fig. 2.

Referring more particularly to the drawings, the numeral 1 represents the crate having parallel side bars 2 and parallel end bars 3 arranged to alternate therewith, and the lowermost end bars constituting supporting cleats 4 for the bottom 5 of the crate. The numeral 6 represents corner reinforcing wires which pass through corresponding openings or apertures near the ends of said supporting cleats 4, and the lowermost side porting cleats 4, pass up against the inner corners of bars 2, pass up against the inner corners of the crate and through corresponding openings or apertures near the ends of the uppermost side bars, and transverse cleats 7 arranged on the upper edges of the upper side bars 2, the ends of said reinforcing wires being bent to engage the supporting cleats 4 and transverse cleats 7 so as to hold them in position. Binding wires 8 are secured at their lower ends near the ends of the supporting cleats 4, passed up inside of the crate against the inner face of the lowermost side bars and are wrapped alternately around the end and side pieces so as to bind them securely together, the upper ends of said binding wires being secured to the upper side pieces in any suitable manner.

The numeral 9 represents reinforcing side strips one being arranged on the inside and at each side of the crate and extending through corresponding openings or apertures in the upper and lower side bars at its ends, the ends of said wires being bent inwardly to hold them in position. The side binding wires 10 are secured at their lower ends in the under edges of said side bars immediately above the lowermost side bars are coiled around said side reinforcing wires and thence passed alternately around said side bars and reinforcing wires.

It will be apparent that a crate constructed in the manner shown and described will be very durable and strong, and will not easily become broken or otherwise damaged by rough handling.

Having described my invention, I claim:—

1. A crate of the character specified, embracing a bottom, a body comprising side and end pieces, the latter being arranged to alternate with the former, binding wires arranged at the corners of the crate body, said wires being bent alternately in different planes or directions to form receiving loops for receiving the ends of the side and end pieces of the body, and upright reinforcing wire arranged at the inner corners of the body and passing through the loops of the binding wires.

2. A crate of the character specified, embracing a bottom, a body comprising side and end pieces, the latter being arranged to alternate with the former, a binding wire arranged at each corner of the crate body, said wire being bent alternately in different directions to form two series of securing loops, one series being disposed approximately at right angles to the other and receiving the adjacent ends of the side pieces, and the other series the adjacent ends of the end pieces, and an upright reinforcing wire, arranged at each inner corner of the crate body and to pass through the loops of the adjacent binding wire.

In testimony whereof I have hereunto set my hand in presence of two subscribing witnesses.

HENRY RIETMANN.

Witnesses:
　HENRY A. FRY,
　CLARENCE HOUK.